United States Patent [19]

Schiller

[11] Patent Number: 5,423,910

[45] Date of Patent: Jun. 13, 1995

[54] SLIP RESISTANT TREATMENT

[75] Inventor: Harold Schiller, Long Beach, Calif.

[73] Assignee: Resistor Products, Inc., Santa Monica, Calif.

[21] Appl. No.: 246,819

[22] Filed: May 20, 1994

[51] Int. Cl.$^6$ ................................................ C09C 3/14
[52] U.S. Cl. ........................... 106/36; 106/287.28; 106/287.29; 252/79.3; 134/2; 134/40
[58] Field of Search ............ 106/36, 287.27, 287.29, 106/287.28; 252/79.3; 156/625; 134/2, 40

[56] References Cited

U.S. PATENT DOCUMENTS

| | | | |
|---|---|---|---|
| 3,107,188 | 10/1963 | Hancock | 252/79.3 |
| 3,627,654 | 12/1971 | Petit | 204/145 R |
| 3,847,688 | 11/1974 | Gillice | 252/79.3 |
| 3,867,218 | 2/1975 | Henry | 252/79.3 |
| 4,227,976 | 10/1980 | Menke | 204/56 M |

*Primary Examiner*—Mark L. Bell
*Assistant Examiner*—Michael Marcheschi
*Attorney, Agent, or Firm*—Ashen Golant & Lippman

[57] ABSTRACT

A solution for treatment of cement, glazed or porcelain surfaces to increase the coefficient of friction of that surface, whether dry or wet to greater than 0.6, preferably to about 0.8, wherein the solution comprises about 10% phosphoric acid, less than about 40 gms. of sodium bifluoride and a wetting agent in water.

9 Claims, No Drawings

SLIP RESISTANT TREATMENT

BACKGROUND

The present invention relates to a liquid treatment for application to concrete or glazed surfaces to reduce the risk of slip and fall accidents. A significant cause of injury to employees in the workplace, customers in commercial establishments and individuals in their own homes is falls resulting from slippery underfoot surfaces. Concrete, ceramic tile, porcelain, enamel and other similar surfaces often can have slippery surfaces and these surfaces they generally become more slippery when wet. The generally recognized criterion for slip resistant floor surfaces is a coefficient of friction of 0.6 obtained in the ASTM C-1028 or D-2047 standardize test. In order to increase the coefficient of friction on concrete, tile or porcelain surfaces (make them less slippery) sand or other abrasive materials may be added to the surface or included in preparation of ceramic tile during formation. Porcelain, such as bath tub surfaces often have adhesive strips of abrasive materials applied to their surfaces.

Even if concrete, tile, enamel or porcelain surfaces, such as bath tubs and shower stalls, are fabricated with so-called non-slip surfaces these surfaces can become extremely slippery when wet from use or cleaning. A popular tile used in commercial food establishments has a coefficient of friction of from about 0.8 to about 0.9 when dry. However, it has been observed that this tile exhibits an unacceptably low coefficient of friction, probably in the range of 0.3 to 0.5 when wet. Porcelain, enamel and cement surface often behave similarly.

Another cause for a low coefficient of friction on presumably non-slip surfaces is the build up of grease, oils, dirt and soap or detergent residues from cleaning compounds which tend to fill the pores in the surface of the material as well as coat a raised abrasive surface. There are several products on the market designed to clean away these surface deposits. In some instances, these treatments further roughen the tile or concrete surface. However, these materials generally require a daily application over an extended period of time to bring about these changes.

U.S. Pat. No. 5,223,168 to Holt addresses such a material and compares its action with other prior available materials. While Holt is primarily a cleaning compound, it is disclosed that continuous daily application can be effective in raising the dynamic or kinetic coefficient of friction from 0.6 to about 0.75 to 0.8 after daily application for a period of 45 to 90 days. The Holt formulation for initial treatment consists of from $5.818\%_v$ to $7.273\%_v$ phosphoric acid ($H_3PO_4$), $10.182\%_v$ to $12.728\%_v$ hydrofluoric acid (HF) and $0.909\%_v$ to $1.818\%_v$ wetting agent in an aqueous solution. The presence of the wetting agent and its concentration in excess of about 1% is believed to be critical to the oil and grease removal purpose of the Holt composition. For daily application this composition is further diluted by adding at least four parts water to one part of the initial treatment solution. One major deficiency of the Holt formula, as well as each of the other treatments tested by Holt, is that no change in coefficient of friction appears to be seen on initial application and continuous daily treatments are necessary before any increase is seen. This increase is demonstrated only by the Holt formula and a few other acid-based cleaners. None of these materials demonstrate the necessary immediate increase following application thus exposing people to a continued risk of falling while believing that the slip hazard has been eliminated by the treatment. Additionally, the Holt formula is a combination of phosphoric acid and hydrofluoric acid, the HF being present in as much as 12.8%. Hydrofluoric acid in such a high concentration is a very hazardous chemical which can severely burn workers applying the treatment if not properly handled.

Thus, there is a need for a material which can be applied to concrete, glazed tile, enamel and porcelain surfaces which can bring about an immediate as well as a long term increase in the coefficient of friction of these surfaces. Additionally, there is a need for a treatment for these surfaces so that they will have an acceptable slip resistant surface whether that surface is wet or dry. Still further, there is a need for an effective material which does not have high levels of hydrofluoric acid, which is highly toxic and corrosive.

SUMMARY

These needs are met by the present invention which comprises a chemical solution for application to concrete and glazed surfaces, such as ceramic, porcelain and tile, which includes phosphoric acid, ammonium bifluoride and a small amount of wetting agent. In a particularly preferred embodiment, the composition comprises about 12 to about 14 fluid ounces of a 75% phosphoric acid solution (about 10% by volume), about 26 to about 40 grams of ammonium bifluoride and about 0.06 fluid ounces of a wetting agent (about $0.05\%_v$), all diluted to 1 gallon by the addition of water. As the ammonium bifluoride density is 1.8 g/cc, the 26 to 40 grams constitutes 17 to 27cc or 0.4 to 0.7%.

An objective of the invention is to provide an aqueous mixture, such that the initial treatment of cement, ceramic tile, enamel or porcelain surfaces will raise the coefficient of friction of that surface significantly, thus reducing the likelihood of slip and fall accidents. It is also an objective of the invention to permanently change the slip characteristics of that surface. It is a still further objective to provide a material for treating surfaces which have a high coefficient of friction when dry but a slippery surface when wet so that the treated surface retains its non-slip characteristics even when wet.

These and other features, aspects and advantages of the present invention will become better understood with reference to the following description, appended claims and experimental examples.

DESCRIPTION

A solution which embodies features of the invention comprises an aqueous mixture of ammonium bifluoride ($NH_4HF_2$), phosphoric acid ($H_3PO_4$). A further embodiment of the invention may include a small quantity in the range of from about 0.05–0.07 fluid ounces of a wetting agent. It is known that an aqueous solution of institutional grade (80%) phosphoric acid, the phosphoric acid being present in about 8% by volume, in combination with industrial grade (70%) hydrofluoric acid and a wetting agent in a ratio by volume of about 4.5:9:1 can be used to degrease concrete, tile and similar surfaces and that extended daily use of such a solution diluted can eventually effect an increase in the coefficient of friction of the treated surface which will continue as long as the treatment is continued on a daily basis.

However, it has now been discovered that an immediate and permanent change of the coefficient of friction of the surface results when the relatively high concentration of hydrofluoric acid is replaced by a smaller amount of bifluoride salt, preferably ammonium bifluoride.

A preferred formula for the surface treatment solution of the invention is 12.8 fluid ounces (378.5 cc) of 75% phosphoric acid, which results in a mixture having about 10%$_v$ phosphoric acid and 1.2 weight ounces (37.85 gm) of ammonium bifluoride (Density=1.5 g/cc), the mixture being diluted to 1 gallon (3785 cc) by the addition of water. 0.06 fluid ounces (1.77 cc) of a wetting agent can be added to the solution to aid in dispersing the solution over the high gloss surface. When the suggested amount of wetting agent is used, the ratio by volume is about 214:14:1. The wetting agent used was Jeffox N-95, a nonylphenoxypolyethoxyethanol manufactured by Texaco. However, this type of wetting agent available from other suppliers, as well as other wetting agents, are also usable. To prevent the N-95 wetting agent from agglomerating in the mixture, it is beneficial to add an equal volume of isopropyl alcohol to the N-95 before adding to the rest of the mixture.

While the mixture set forth above is a preferred composition, suitable mixtures can be obtained with variations of the concentrations. For example, the amount of 75% phosphoric acid can be varied from about 6 to about 14 fluid ounces (177–414 cc) and from about 0.8 to about 1.4 weight ounces (25 to 43.5 gms) of the ammonium bifluoride can be used. Additional Jeffox N-95 will make the solution sudsier during application. A suitable volume ratio of phosphoric acid, ammonium bifluoride and wetting agent is about 200:10:1, wherein the phosphoric acid is a 75% solution and constitutes about 9–11 volume percent of the solution. While these ranges of concentration are preferred, further variation thereof as well as variation of the quantity of wetting agent is possible. Higher concentrations increase the effect and lower concentrations, for example, as low as 6 ounces of phosphoric acid, decrease the effect. The upper and lower limits are not presently known.

EXAMPLE 1

A concrete surface and a tile surface were treated using the preferred formula set forth above using the following procedure:

1) All dirt was removed and the surface was degreased.
2) The mixture of the preferred formulation was sprayed over the area to be treated and complete coverage was assured by brushing the wet surface with a bristle brush.

The mixture was allowed to remain on the surface for about 6 minutes.

3) The treatment mixture was then removed using water and the surface was allowed to dry. (Complete removal of the treatment solution is indicated by lack of a slippery feel.)

The surfaces were then tested using ASTM C1028-89 as modified by the Ceramic Tile Institute to include leather and rubber heels. The static coefficient of friction for concrete and tile are listed below in Tables 1 and 2.

TABLE 1

| | CONCRETE SURFACE AVERAGE STATIC COEFFICIENT OF FRICTION* | | | |
|---|---|---|---|---|
| | DRY | | WET | |
| TEST SURFACE | TREATED | UNTREATED | TREATED | UNTREATED |
| Leather | 0.80 | 0.56 | 0.85 | 0.33 |
| Rubber | 0.96 | 0.60 | 0.93 | 0.64 |
| Neolite | 0.66 | 0.59 | 0.71 | 0.56 |

*Average of four (4) tests with each heel assembly, each consecutive test perpendicular to the previous test.

TABLE 2

| | TILE SURFACE* AVERAGE STATIC COEFFICIENT OF FRICTION | |
|---|---|---|
| TEST SURFACE | DRY TREATED | WET TREATED |
| Leather | 0.73 | 0.68 |
| Rubber | 0.88 | 0.81 |
| Neolite | 0.72 | 0.70 |

*The untreated tile was observed to be slippery with a coefficient of friction believed to be less than 0.6.

All tests, which used starting materials which had unacceptable surface properties, showed that the treatment caused a significant improvement in the coefficient of friction irrespective of whether the surface was wet or dry. These results were obtained without a significant change in the appearance of the surface. Further, the slip resistant properties remain as long as the surface is not cleaned with abrasive cleansers. While the samples were treated for 6 minutes, lesser times (about 4 minutes), depending on the specific nature of the surface treated, may be acceptable. Highly glazed surfaces may require longer treatment times, but the effect is the same. Also, a greater increase in coefficient of friction, up to a reading of 1.0 can be obtained by extending the treatment time to 15 or more minutes, or multiple treatments of shorter time duration.

Tests also indicate that use of the treatment formula has significant advantages even on surfaces designed to be non-slip or non-skid. A non-skid ceramic tile designed for commercial establishments was tested to have a excellent coefficient of friction when dry of 0.9. However, when wet, the surface exhibited an unacceptable coefficient of friction of about 0.4. Following treatment with the preferred formula, the coefficient of friction measured wet was increased to about 0.8.

Although the present invention has been described in considerable detail with reference to certain preferred versions and uses thereof, other versions and uses are possible. For example, other sources of hydrogen ions, such as hydrochloric, sulfuric or acetic acid can be used in place of phosphoric acid. In particular, HCl is useful where harm to surrounding surfaces is not of concern and the application of a totally vaporizable mixture, which does not require a water rinse, is acceptable. Additionally, other soluble fluoride salts, such as sodium and potassium salts are alternatives for the ammonium bifluoride. Therefore, the spirit and scope of the appended claims should not be limited to the description of the preferred versions contained herein.

What is claimed is:

1. An aqueous solution for treating concrete, glazed enamel or porcelain surfaces to increase the coefficient of friction of the surface, the aqueous solution comprising a mixture of phosphoric acid and ammonium bifluoride in water wherein one gallon of the solution contains from about 6 to about 14 fluid ounces of 75% phosphoric acid solution and from about 25 gms to about 43.5 gms of ammonium bifluoride.

2. The aqueous solution of claim 1, further including from about 0.05 to about 0.07 fluid ounces of a wetting agent.

3. The aqueous solution of claim 2 wherein the phosphoric acid solution is a 75% solution, the phosphoric acid, ammonium bifluoride and wetting agent are present in the ratio by volume of about 200:10:1 and the phosphoric acid constitutes about 9 volume percent to about 11 volume percent of the solution.

4. The aqueous solution of claim 2 wherein one gallon of the solution contains 12.8 fluid ounces of 75% phosphoric acid solution, 1.2 weight ounces of ammonium bifluoride and 0.06 fluid ounces of a wetting agent.

5. A process for treating concrete and glazed or porcelain surfaces to increase the coefficient of friction of the surface comprising applying to said surface a mixture of phosphoric acid, ammonium bifluoride and water wherein one gallon of the mixture contains from about 6–14 fluid ounces of 75% phosphoric acid and from about 25–43.5 gms weight ounces of ammonium bifluoride.

6. The process of claim 5 where the mixture further comprises a wetting agent.

7. The process of claim 6 where the mixture is allowed to remain on the surface for about 4 to about 15 minutes.

8. The process of claim 7 wherein the coefficient of friction of a concrete surface as measured using a wet leather heel assembly is increased from about 0.33 to about 0.85.

9. The process of claim 7 wherein application of the mixture to a tile surface having a dry coefficient of friction of 0.9 and a wet coefficient of about 0.4 produces a tile with a wet coefficient of friction of about 0.8.

* * * * *